June 4, 1940.   J. V. CAPUTO   2,202,898
PIPE WELDING
Original Filed Dec. 31, 1934   2 Sheets-Sheet 1

INVENTOR
James V. Caputo
by his attorneys
Byrnes, Stebbins & Blenko

June 4, 1940.                J. V. CAPUTO                2,202,898
                              PIPE WELDING
                  Original Filed Dec. 31, 1934    2 Sheets—Sheet 2
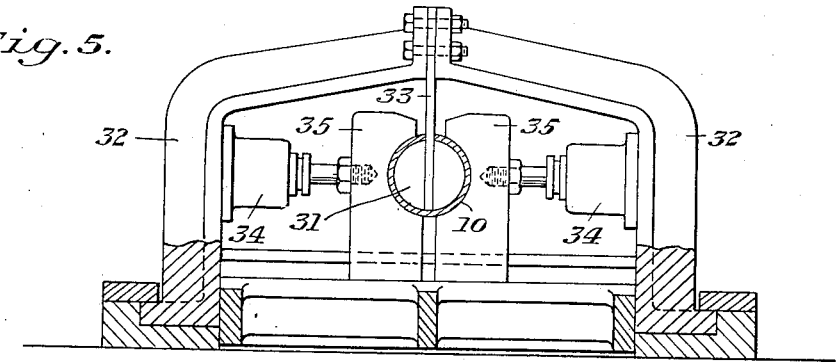
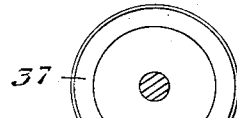
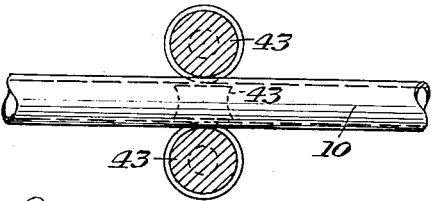
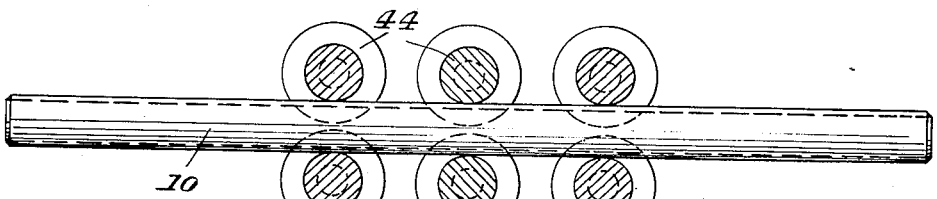
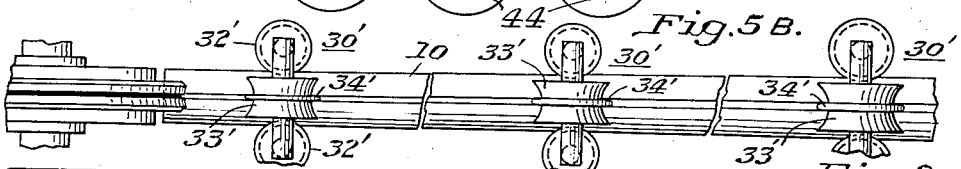
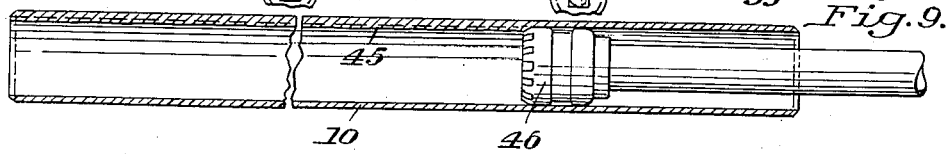
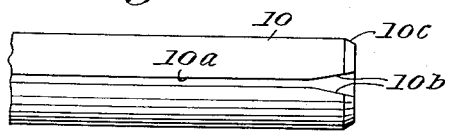
INVENTOR
James V. Caputo
by his attorneys
Byrnes, Stebbins & Blenko Patented June 4, 1940

2,202,898

UNITED STATES PATENT OFFICE 2,202,898

PIPE WELDING

James V. Caputo, Crafton, Pa.

Application December 31, 1934, Serial No. 759,809
Renewed July 8, 1939

15 Claims. (Cl. 29—156)

My invention relates to the art of welding and, in particular, to a method of preparing blanks for the actual welding operation, in the manufacture of tubular articles, specifically pipe.

The manufacture of pipe of a wide range of wall thicknesses by the electric resistance welding method has now attained a substantial magnitude. Certain difficulties, however, have been experienced in the welding operation. One of these is that the edges of a formed tubular blank having an axial seam cleft tend to get out of alignment during welding. The seam cleft itself also tends to twist so that substantial guides are required to insure proper introduction of the edges to the usual welding electrode. This difficulty appears to be due to the fact that the blanks are sheared to size and then formed by progressive rolling or by dies and presses. It is recognized that for satisfactory welding, the edges to be joined must be accurately registered, especially when welding heavy wall pipe. The edges, furthermore, should be precisely parallel to insure uniformity of contact pressure throughout the entire area. When initiating such contact, either the inner or the outer corners of the edges may be brought together first.

It has been attempted to overcome the distortion of the blank edges resulting from forming by cold working the edges of the blank (Gail Patent No. 1,510,932) but the pressures required to effect any substantial working are quite large. A slight cold working of the edges would not remove the irregularities which give rise to non-uniform contact between the edges themselves and between the edges and the electrode. A wavy condition of the edges causes the contact thereof with the electrode to be intermittent so that non-uniform welding and injury to the electrode and skelp result.

In making heavy wall pipe by electric welding, furthermore, the product is manufactured in relatively short lengths, say 50 feet. It is necessary, of course, that any end scrap loss be reduced to a minimum because of the relatively large percentage of such end scrap length to the total length welded. Difficulty has been experienced heretofore in entering successive lengths into the welding throat. Attempts have been made to avoid injury to the electrodes in entering the work, including the raising of the electrode before each length enters. Such operations, however, are not easy at best, and the frequency with which they must be repeated introduces other complications.

I have invented a method of preparing blanks for the manufacture of tubes by the electric resistance welding method which overcomes the objections to the previous processes. In the now preferred practice of my invention, I preliminarily form a steel plate which has been roughly dimensioned to the proper size, into tubular shape. I then place the preliminarily formed blank on a mandrel and subject it to a final forming operation. I then accurately trim the edges of the seam cleft while the blank is disposed on a mandrel and carry out the shearing so that the edges, when butted, have intimate and uniform contact throughout their entire area. I then form the ends of the blank to facilitate entry thereof into the welder and forward it to the latter for the welding operation. I also prefer to exert a positive guiding action on the abutting edges as they advance toward the welder, so as to cause them to approach each other at a constant angle. After welding, the resulting tube is subjected to planishing, straightening, sizing and reaming operations and a final inspection.

For a complete understanding of the invention, reference is made to the accompanying drawings illustrating diagrammatically the present preferred steps of my method and, in diagrammatic form, apparatus suitable for performing these steps. The apparatus is described more fully and claimed in my copending application Serial No. 6,034, filed February 11, 1935, for Manufacture of pipe blanks. In the drawings:

Figure 5 is a sectional view along the line V—V of Figure 4;

Figure 5a is a partial plan view of a blank ready for entry into the welder;

Figure 5b is a partial plan view showing the positive guiding of the seam edges as they move toward the welder;

Figure 6 is a diagrammatic showing of the electric welding and the removal of the external burr formed thereby;

Figure 7 indicates the planishing operation by which the exterior of the seam is rolled down;

Figure 8 represents the straightening operation; and

Figure 9 shows the reaming of the burr formed on the interior of the tube.

In carrying out my invention, I take a piece of plate, roughly sized in accordance with the requirements of the tube to be made. The corners at both ends are first preferably clipped off in accordance with the usual practice in making pipe by the furnace weld method. The plate is then subjected to a cleaning treatment, such as sand or shot blasting. The cleaned skelp is then subjected to a preliminary forming operation either by progressive rolling or by die forming, the latter being preferred.

The preliminarily formed blank indicated at 10 is then disposed on a mandrel 11. The mandrel is supported by yoke members 12 and 13. The construction of the yokes and the manner of supporting the mandrel will be more fully explained later. Suffice it to say for the present that the mandrel is supported on plates depending from the yokes 12 and 13 so as to permit the passage thereover of preliminarily formed blanks, such as that shown at 10, having axial seam clefts for receiving the mandrel supporting plates.

Figure 1:
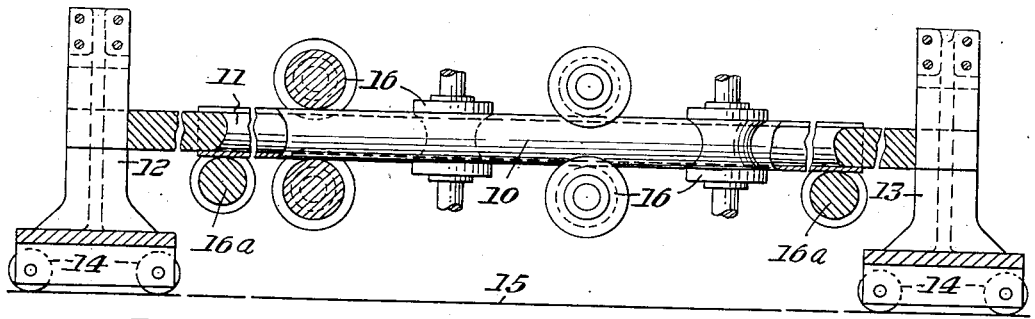
Figure 1 is a longitudinal, vertical, sectional view through the mechanism for effecting final forming of the lengths.
Figure 2:
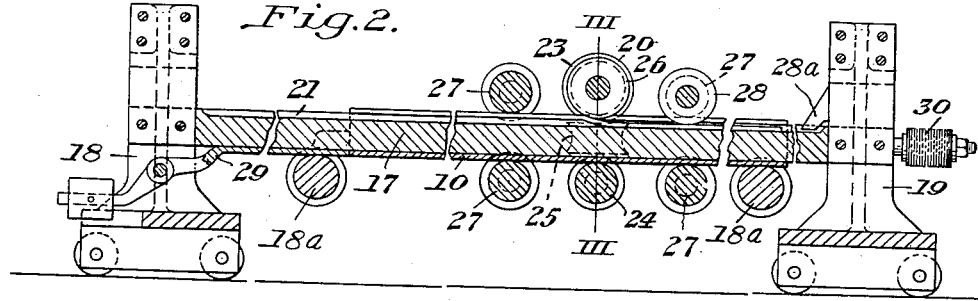
Figure 2 is a similar view showing mechanism for slitting the edges of the blank to line them up accurately.
Figure 4:
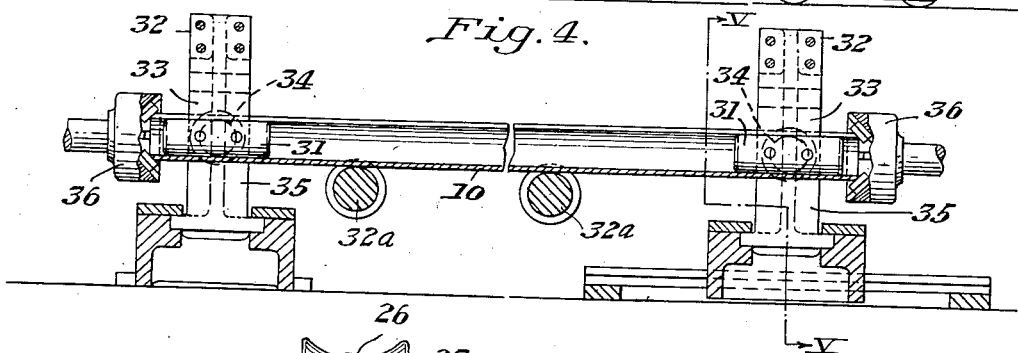
Figure 4 is a similar view showing means for holding the blank while the ends thereof are suitably worked.

The yokes 12 and 13 are mounted on wheels 14 for traveling movement along the surface 15. Any convenient means may be provided for actuating the yokes. Horizontal and vertical final forming rolls 16 are journaled in suitable housings (not shown) between the yokes 12 and 13. The rolls may be idle or driven. Auxiliary supporting rolls, such as shown at 16a, are journaled in any suitable bearings adapted to be traversed by the yokes. The yoke 12 has a pusher (not shown) similar to that indicated at 29 in Figure 2. When depressed, this permits the blank 10 to be advanced on to the mandrel 11. After the blank has passed beyond the pusher, the counterweight of the latter holds it up in position to exert pressure against the trailing end of the blank to forward it. The rolls 16a are arranged to permit passage of the pusher therebeyond.

The mandrel 11 has generally the form of a cylinder and has a greater diameter than the finished pipe to be made. The edges of the seam thus lie tightly on the mandrel without overlapping. The length of the mandrel is sufficiently greater than that of the pipe to be made to permit the blank to be placed on that portion of the mandrel which may be moved to one side or the other of the forming rolls 16. The mandrel is moved to its extreme left-hand position before the blank is placed thereon. The mandrel with the blank is then moved to the right and during such movement, the rolls 16 effect a final forming and shaping thereof about the mandrel. When the blank has passed through the last stand of rolls, it may be removed from the mandrel and is then ready for the next step in the process.

Figure 3:
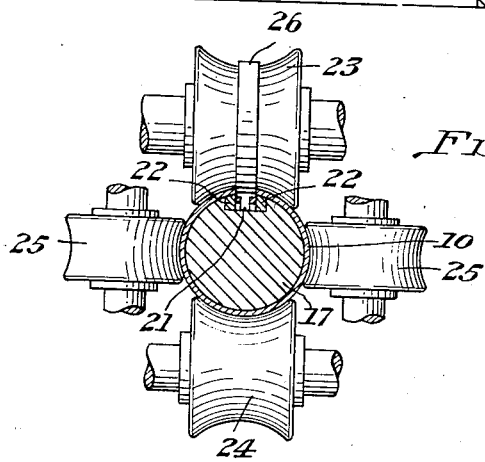
Figure 3 is a sectional view along the line III—III of Figure 2.

The edges of the finally formed blank are now ready to be accurately sheared. For this purpose, I employ a mandrel 17 supported in the manner already indicated by yokes 18 and 19 arranged on opposite sides of a rotary shear 20 and arranged for traveling movement relative thereto. The mandrel 17 has an axial slot 21 therein in which are disposed a pair of fixed cutting knives 22. The shear 20 comprises top and bottom rolls 23 and 24 and side rolls 25 journaled in a suitable housing (not shown). The roll 23 has a disc cutter 26 formed thereon adapted to cooperate with the knives 22 to progressively trim the edges of the formed blank 10, as shown in Figure 3. The cutter 26 and its associated rolls may be driven or idle. The shear also has associated with it guiding and holding rolls 27 also journaled in suitable housings (not shown). The upper right-hand roll 27 also has a fin 28 entering the seam cleft to hold down the edge portions of the blank which are removed by the cutter. The fin 28 may also be used to cold work the sheared edges to any desired extent, such as rolling, edging or surfacing, prior to welding. A cleaning tool 28a on the yoke 19 is effective to remove sheared edges from the groove 21. The exact shape and size of the mandrel will be such that the seam edges will be exactly parallel or slightly out of parallelism radially, as desired, when they engage to pass welding current. This method of shearing is particularly adapted to prepare plate edges for welding because the shape of the edges resulting from the shearing are specially well adapted to initiate the welding operation progressively. It is thus possible to position the blank during shearing so that after shearing the edges along parallel planes, the edges will, when the blank is maintained in circular conformation, engage only at their inner or outer corners or will engage flatwise throughout their area. The former will result if the blanks are disposed during shearing on a mandrel having a somewhat elliptical section; the latter, if the section of the mandrel by which the blanks are disposed during shearing is substantially circular.

A pusher 29 is pivoted on the yoke 18, to advance the blank through the shear 20. After the blank has been passed through the shear, it is stripped from the mandrel 17. A brush 30 on the latter cleans the interior of the blank of all foreign matter collected therein, as it is removed. Supporting rolls 18a similar to the rolls 16a assist the movement of the blank through the shear, and prevent the blank from riding on the knives 22 after completion of the shearing.

The blank is then disposed on a pair of spaced mandrels 31 mounted on yokes 32 in the manner already indicated. Auxiliary support rolls 32a are journaled between the yokes. The right-hand yoke 32 is slidable along the axis of the mandrel 31 thereof. The mandrels 31, as shown in Figure 5, are supported on the yokes 32 by depending plates 33. The yokes 32 are provided with cylinders 34 having pistons reciprocating therein adapted to operate clamping jaws 35. The jaws 35 serve to clamp the blank 10 adjacent its ends formed on the mandrels 31. While the ends of the pipe are so held, one or both are subjected to a machining or facing operation. This may be in the nature of a beveling effected by a rotary cutter 36, or may be simply the turning off of a portion of the wall thickness of the blank adjacent the leading end thereof by some other suitable tool. Either of these operations facilitates the entry of the blank into the welder, as will be described later.

Figure 5a shows a blank ready for entry into the welder. The seam cleft 10a, the clipped corners 10b and the beveled end 10c, all contribute a degree of resilience to the completed blank whereby it may safely be entered into a rigid welding throat without exerting excessive forces on the rolls constituting it. The corners of the skelp being clipped do not injuriously scrape the electrode.

As a further assurance of proper alignment of the edges to be welded, I exert a positive continuous guiding action thereon as they approach the welder 37. This step is shown in Figure 5b. As there shown, the blank 10, before reaching the welder, traverses a plurality of stands 30' of guide and feed rolls which are preferably power driven. Each stand includes a bottom support roll (not shown), side rolls 32' and a guide roll 33'. The guide rolls have fins 34' adapted to enter the seam cleft in the blank. The fins of the several guide rolls decrease in width in the direction of travel of the blank. The blank edges, being forced against the fins by the side rolls 32' are thus caused to approach each other at a substantially constant angle as the blank moves toward the welder. The stands 30' and their rolls may be designed to have sufficient strength to effect cold working of the blank edges to cause them to conform to the shape of the sides of the fins 34'.

The welder is indicated schematically in Figure 6 and comprises an electrode 37, side pressure rolls 38 and a bottom support roll 39 forming a welding throat. The electrode has two rim portions insulated from each other adapted to engage the edges of the blank while the pressure rolls force them together and effect a weld therebetween when sufficiently heated. The welding electrode and rolls are mounted in suitable bearings (not shown). These bearings may safely be rigidly backed up, because the beveling of the leading end of the blank precludes the possibility of subjecting the members constituting the welding throat to excessive stress on the entrance of a pipe blank thereinto.

During the welding, a bead or burr 40 is formed exteriorly of the welded seam. I provide a scraper 41 or other suitable means for removing this burr progressively as the welding proceeds.

The welded pipe next passes to planishing rolls 43 which are effective to provide a final finish on the exterior of the seam.

After the planishing operation, the pipe is subjected to the action of straightening and sizing rolls 44 which may be of any suitable type and arranged so as to precisely straighten and size the pipe to finished dimensions.

The welding operation also forms an interior bead or burr 45 and I provide a reamer 46 driven by any convenient source of power and suitably mounted for movement through a pipe length properly supported for that purpose. The reamer is revolved as it is advanced through the pipe and quickly removes the burr, leaving a smooth finished surface at the seam. A broach or any other equivalent can be used instead of the reamer shown. After a final inspection, therefore, the pipe is ready for any desired finishing operations prior to shipment, such as cropping the ends, threading, enameling, or the like.

It will be apparent from the foregoing description that the invention provides a method of preparing blanks for welding into pipe, which is characterized by numerous advantages over the practice heretofore followed. In the first place, by finally trimming the blank edges after forming, a precisely dimensioned blank with sheared abutting edges is furnished to the welder so that the welding operation itself is greatly facilitated and simplified. Since the abutting edges of the blank are sheared after forming, perfect registry thereof is insured, any irregularities or wavy portion resulting from the forming being removed by the edge shearing to which the blank is subjected after forming and prior to welding. If desired, of course, the sheared edges may be subjected to a light cold working to further improve their smoothness and accurate registry. Since the abutting edges are not distorted or deformed, a comparatively light pressure exerted thereon by the electrode assures a uniform contact at the seam whereby the proper current is supplied thereto for welding without substantial variation. The uniformity of the weld is thus greatly enhanced and, correspondingly, the quality of the product. The electrode life is also lengthened. When the edges of the blank are finally brought into abutting engagement by the pressure rolls of the welder, they are exactly aligned and continuous uniform engagement of the edges is thus obtained and further cold working of the edges is not necessary.

Another great advantage of the invention is that the seam cleft itself is precisely parallel to the axis of the blank so that proper registry of the edges with the welding electrode will occur. Since the rough edges of the formed blank are sheared off progressively from one end to the other while the blank is held tightly around a mandrel, it follows that the seam cleft must be in exact alignment with the blank axis. Twisting, warping and movement of the blank out of alignment with the welding electrode are thus prevented. A frequent cause of defective welds in previous methods is thereby removed.

The mounting of the electrode and the welding rolls is simplified by the fact that blanks formed in accordance with my invention do not impose excessive forces thereon at the time they enter the throat, or cause any but a minimum amount of rubbing of the skelp against the electrode faces. The leading end of the blank is made contractible by clipping the corners of the flat skelp and beveling or turning the end of the blank after it has been formed into tubular shape. The clipping of the corners introduces a further useful result. The widening of the seam cleft effected by clipping the corners prevents current from flowing across the seam on initial engagement of the leading end of the blank with the electrode. The welding current first starts to flow around the circumference of the blank, but is gradually diverted to a path across the seam edges as the electrode engages the narrower portion of the cleft. This prevents blistering and burning which might result from instantaneous initiation of the flow of current across the cleft at the leading end of the blank, and thus reduces the end scrap loss. Such injury to the electrode increases the frequency of the necessary turning down or machining of the electrode which requires the welder to be shut down, thus curtailing production as well as reducing the useful life of the electrode. Similarly, the flow of current is gradually terminated as the trailing end of the blank leaves the electrode. The size of the blank, even with the seam cleft closed, must necessarily be somewhat greater than the size of the finished pipe because of the metal which is upset in the formation of the weld and forced into the burrs along the interior and exterior of the seam. This has made it necessary in the past to resort to various expedients to prevent breakage of or injury to the welding electrode and rolls on engagement of the work therewith.

Proper alignment of the edges to be welded is further secured by positively guiding them toward each other at a substantially constant angle as they approach the welder.

Although I have illustrated and described but one preferred practice of the invention, it will be apparent that numerous changes in the procedure outlined herein may be made without departing from the spirit of the invention or the scope of the appended claims.

I claim:

1. In the manufacture of pipe blanks for butt welding, the steps including providing a blank having a longitudinal seam cleft, maintaining the blank in such condition that the axis of the transverse section thereof which passes between the blank edges, differs slightly in length from the axis at right angles thereto, while shearing said edges, whereby when the blank is held in circular shape with edges abutting, the edges have substantially line contact only, the planes of the edges forming a dihedral angle.

2. The method defined by claim 1 characterized by placing said blank on a mandrel having an elliptical cross-section and shearing the blank edges into parallelism with each other throughout the full thickness of the blank wall.

3. The method of making pipe blanks which includes the steps of forming flat metal into a pipe blank having a longitudinal seam gap, placing said blank over an internal support oval in cross-section, and working the opposed edges of such blank into parallelism with each other while the blank is supported by the mandrel.

4. In the manufacture of pipe blanks for butt welding, the steps including placing a blank having a longitudinal seam cleft on a mandrel, maintaining the blank in such condition that the axis of the trasverse section thereof which passes between the blank edges, differs slightly in length from the axis at right angles thereto, and shearing said edges, whereby when the blank is held in circular shape with edges abutting, the edges have substantially line contact only, the planes of the edges forming a dihedral angle.

5. The method of making pipe blanks which includes the steps of forming flat metal into a pipe blank having a longitudinal seam gap, moving said blank over an internal support oval in cross-section, and working the opposed edges of such blank throughout their full radial dimension to prepare them for welding.

6. The method defined by claim 5 which includes the further step of so positioning the blank edges during working as to cause said edges to have substantially line contact only with each other when abutted.

7. The method defined by claim 5 which includes so positioning the blank edges during working as to cause said edges to engage each other substantially throughout their entire area when abutted.

8. The method of making pipe blanks which includes the steps of forming metal into a pipe blank having a longitudinal seam gap, moving said blank over an internal support circular in cross-section, shearing the opposed edges of the blank along parallel planes throughout their full radial dimension while supporting the blank so as to hold the cleft edges in fixed spaced relation throughout the length of the blank.

9. The method defined by claim 8 which includes so positioning the blank edges during shearing as to cause said edges to have substantially line contact only with each other when abutted.

10. The method defined by claim 8 which includes so positioning the blank edges during shearing as to cause said edges to have contact with each other substantially throughout their entire area when abutted.

11. In a method of making cylindrical blanks for the manufacture of pipe by progressive electric welding, the steps including forming flat skelp into substantially cylindrical blanks having a longitudinal seam cleft, and shearing the edges of the blank after forming to cylindrical shape, to provide finished, matching edges adapted to abut closely and uniformly during progressive welding thereof while supporting the blank so as to hold the cleft edges in fixed spaced relation throughout the length of the blank.

12. In a method of making pipe blanks, the steps including forming flat skelp into substantially cylindrical blanks having a longitudinal seam cleft, so deforming the blanks that the edges of the seam cleft are non-parallel in a generally radial direction and shearing the edges while the blank is so deformed.

13. In a method of making cylindrical blanks for the manufacture of pipe by progressive electric welding, the steps including forming flat skelp into substantially cylindrical blanks having a longitudinal seam cleft, placing the blank on a supporting mandrel and, while the blank is supported on said mandrel throughout the length of the blank in such manner as to hold the edges in fixed spaced relation throughout the length of the blank, shearing the edges of said seam cleft to provide finished, matching edges adapted to abut closely and uniformly during progressive welding thereof.

14. In a method of making cylindrical blanks for the manufacture of pipe by progressive electric welding, the steps including forming flat skelp into substantially cylindrical blanks having a longitudinal seam cleft, and placing the blank on a supporting mandrel, the diameter of the mandrel being at least as great as the inside diameter of the blank, moving the blank and mandrel through a roll stand having a roll which exerts metal working pressure against the edges of the seam cleft while supported on the mandrel, thereby working them into substantial parallelism while on the mandrel.

15. In a method of preparing pipe blanks for welding, the steps including forming flat skelp into a substantially cylindrical blank having a longitudinal seam cleft, the edges of which have their opposite surfaces disposed interiorly and exteriorly of the blank respectively, engaging one surface of both the edges of said cleft with a dual-edged cutter, and engaging the opposite surface of both edges of said cleft with cutting edges adapted to cooperate with said cutter, thereby progressively shearing both the edges of the seam cleft simultaneously.

JAMES V. CAPUTO.